(12) United States Patent
Chen et al.

(10) Patent No.: US 6,446,172 B1
(45) Date of Patent: Sep. 3, 2002

(54) METHOD AND SYSTEM FOR CONTROLLING THE MEMORY ACCESS OPERATION PERFORMED BY A CENTRAL PROCESSING UNIT IN A COMPUTER SYSTEM

(75) Inventors: Chia-Hsin Chen, Taipei; Nai-Shung Chang, Taipei Hsien, both of (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/335,602

(22) Filed: Jun. 18, 1999

(30) Foreign Application Priority Data

Mar. 2, 1999 (TW) ........................................ 88103131 A

(51) Int. Cl.[7] ............................................. G06F 12/08
(52) U.S. Cl. ........................................ 711/143; 711/167
(58) Field of Search ................................. 711/167, 146, 711/154, 118, 119, 120, 121, 143, 169; 712/23

(56) References Cited

U.S. PATENT DOCUMENTS

| 5,572,703 A | * | 11/1996 | MacWilliams et al. ..... 711/146 |
| 5,715,421 A | * | 2/1998 | Akiyama et al. ........... 365/203 |
| 5,778,245 A | * | 7/1998 | Papworth et al. ............. 712/23 |
| 5,813,036 A | * | 9/1998 | Ghosh et al. ................ 711/146 |
| 5,960,459 A | * | 9/1999 | Thome et al. ............... 711/154 |
| 5,963,721 A | * | 10/1999 | Shiell et al. ................. 710/129 |
| 6,216,215 B1 | * | 4/2001 | Palanca et al. ............... 712/23 |
| 6,378,055 B1 | * | 4/2002 | Chang ......................... 711/118 |
| 2002/0056028 A1 | * | 5/2002 | Chang ......................... 711/143 |

* cited by examiner

Primary Examiner—Matthew Kim
Assistant Examiner—Pierre-Michel Bataille
(74) Attorney, Agent, or Firm—J.C. Patents

(57) ABSTRACT

A memory access control method and system is provided for use on a computer system to control the memory access operation by a central processing unit (CPU) to a memory unit in a more efficient manner than the prior art. This memory access control method and system is characterized by, for each read request from the CPU, the prompt transfer of the corresponding internal read-request signal to the memory control unit, right after it is issued and without waiting until the CPU issues the L1 write-back signal of the current read request. If the current read request is a hit to the cache memory, a read-stop signal is promptly issued to stop the current read operation on the memory unit, and then a cache write-back operation is performed to write the cache data back into the memory unit. This method and system can help reduce the period of waiting states by the CPU, thus increasing the overall memory access performance by the CPU and the overall system performance of the computer system.

7 Claims, 16 Drawing Sheets

METHOD AND SYSTEM FOR CONTROLLING THE MEMORY ACCESS OPERATION PERFORMED BY A CENTRAL PROCESSING UNIT IN A COMPUTER SYSTEM

CROSS-REFERENCE TO RELATED APPLICATION

This application claims the priority benefit of Taiwan application serial No. 88103131, filed Mar. 2, 1999, the full disclosure of which is incorporated herein by reference.

BACKGROUND OF THE INVENTION

1. Field of the Invention

This invention relates to computer memory access operation, and more particularly, to a method and system used in a computer system to control the memory access operation by a central processing unit (CPU) in a more efficient manner by reducing the period of wait states for L1 write-back signals.

2. Description of Related Art

In this information age, computers have become an indispensable office tool, in all walks of life. In the use of computers, performance is a primary concern. Many factors can affect the performance of a computer system, including the speed of the CPU, the type of the primary memory being used, efficiency of memory access control, and so forth. Presently, dynamic random-access memory (DRAM) is widely used as the primary memory of most computer systems. Conventional memory access methods that can help boost the computer performance include, for example, the Fast Page Mode (FPM) method and the Extended Data Out (EDO) method. Moreover, a new type of DRAM, called synchronized DRAM (SDRAM), allows fast access speed to the data stored therein.

FIG. 1 is a schematic block diagram of a conventional memory access control method and system, as indicated by the reference numeral 120, which is designed for controlling the memory access operation by a CPU, as indicated by the reference numeral 110, on a memory unit, as indicated by the reference numeral 130.

The memory access control system 120 is coupled between the CPU 110 and the memory unit 130 and is composed of a CPU interface 121 and a memory control unit 122. The CPU 110 further includes a cache memory 112. The CPU 110 and the CPU interface 121 are interconnected via a number of data lines ADS, REQ, HITM, HTRDY, DBSY, DRDY, and HD, all of which are described later in detail; the CPU interface 121 and the memory control unit 122 are interconnected via two data lines DADS and DAT; and the memory control unit 122 and the memory unit 130 are interconnected via two data lines CMD and MD.

The access operation by the CPU 110 to the memory unit 130, whether read or write, is controlled by the memory access control system 120. The data communication between the CPU 110 and the memory control unit 122 is controlled by the CPU interface 121. When the CPU 110 wants to gain access to the memory unit 130, it issues and transfers access requests via the CPU interface 121 to the memory control unit 122. In write operations, the memory control unit 122 is used to control the writing of the output data from the CPU 110 into the memory unit 130; and whereas in read operations, the memory control unit 122 controls the retrieval of the CPU-requested data from the memory unit 130 and then transfers the retrieved data via the CPU interface 121 to the CPU 110.

When the CPU 110 wants to gain access to the memory unit 130, it first sets the ADS data line at a LOW-voltage logic state. The intended access operation of either write or read is indicated by the logic voltage state of the REQ data line. Moreover, whether the request is a hit or a miss to the cache memory 112 at updated data is indicated by the logic voltage state of the HITM data line. For instance, in the case of a cache hit, the HITM data line is set at a LOW-voltage logic state, and whereas in the case of a cache miss, the HITM data line is set at a HIGH-voltage logic state. The HTDRY signal is accordingly used by the CPU to export the data to be written back. When the DRDY and DBSY data lines are set at a LOW-voltage logic state, this indicates that the CPU interface 121 wants to transfer data via the HD data line to the CPU 110.

Furthermore, the CPU interface 121 and the memory control unit 122 use the DADS and DAT data lines for data communication therebetween. The DADS signal is a converted version of the ADS signal from the CPU 110. The DAT data line is used to transfer the output data from the CPU 110 that are to be written into the memory unit 130, or the data that are retrieved from the memory unit 130 and to be transferred via the CPU interface 121 to the CPU 110.

The memory control unit 122 and the memory unit 130 use the CMD and MD data lines for data communication therebetween. The CMD data line is used to transfer access control signals to the memory unit 130, while the MD data line is used to transfer data to and from the memory unit 130.

To read data from the memory unit 130, the CPU 110 successively issues a number of read requests. If any one of the read requests is a hit to the cache memory 112, the CPU 110 uses the HITM data line to issue an L1 write-back signal to indicate such a condition to the memory control unit 122, and in which case, a cache write-back operation is performed to write the cache data back into the memory unit 130. Typically, the L1 write-back signal of each read request is issued several clock cycles after the read request is issued. The conventional memory access control system 120 operates in such a manner that, for each read request from the CPU 110, the CPU interface 121 sends out a corresponding internal read-request signal to the memory control unit 122 until the L1 write-back signal of the current read request is received. In response to this internal read-request signal, the memory control unit 122 then performs a read operation to retrieve the requested data from the memory unit 130 and then transfers the retrieved data via the CPU interface 121 to the CPU 110.

Therefore, there exists a wait state in which the conventional system waits until the L1 write-back signal of the current read request is issued by the CPU 110 for the CPU interface 121 to issue the internal read-request signal to the memory control unit 122. Typically, the overall memory access operation performed by a CPU includes 60% read operation, 15% cache write-back, and 25% write operation. Therefore, the overall system performance of a computer system can be enhanced by solely increasing the speed of the read operation. The conventional method and system of FIG. 1, however, is low in read operation since it must frequently wait for L1 write-back signals.

SUMMARY OF THE INVENTION

It is therefore an objective of the invention to provide a method and system for controlling the memory access operation performed by a CPU, which can help increase the speed of the read operation performed by the CPU so that the overall system performance of the computer system can be enhanced.

In accordance with the foregoing and other objectives of the invention, a new method and system is proposed for use in a computer system to control the memory access operation performed by a CPU on a memory unit in a more efficient manner.

The memory access control method and system of the invention is characterized by the prompt issuance of the internal read-request signal for each read request from the CPU to the memory control unit, promptly after it is issued and without waiting until the L1 write-back signal of the read request is issued. If one read request is later found to be a hit to the cache memory, a read-stop signal is promptly issued to stop the current read operation on the memory unit, and then a cache write-back operation is performed to write the cache data back to the memory unit.

The method of the invention includes the following steps: (1) in response to the current read request from the CPU, promptly issuing an internal read-request signal to the memory unit without waiting until the CPU issues the L1 write-back signal of the current read request; (2) in response to the internal read-request signal, performing a read operation on the memory unit; and (3) if the current read request is a hit to the cache memory, generating a read-stop signal to stop the current read operation on the memory unit, and then generating a write-enable signal to the memory unit to perform a cache write-back operation to write the cache data from the cache memory of the CPU back to the memory unit.

The system of the invention includes the following constituent parts: (a) a CPU interface coupled to the CPU, which is capable of promptly issuing an internal read-request signal in response to the read request from the CPU without waiting until the CPU issues the L1 write-back signal of the current read request, and thereafter is capable of generating a read-stop signal provided that the current read request is a hit to the cache memory; and (b) a memory control unit coupled between the CPU interface and the memory unit, which is capable of performing a read operation on the memory unit in response to the internal read-request signal from the CPU interface, and in response to the read-stop signal, is capable of stopping the current read operation on the memory unit and abandoning the currently retrieved data from the memory unit so as to instead perform a cache write-back operation to write cache data from the cache memory of the CPU back to the memory unit.

In the system of the invention, the memory unit can be a synchronized dynamic random-access memory (SDRAM) or the like.

The foregoing method and system of the invention can help reduce the period of waiting states required by the CPU, thus increasing the overall memory access performance by the CPU and the overall system performance of the computer system.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 2:
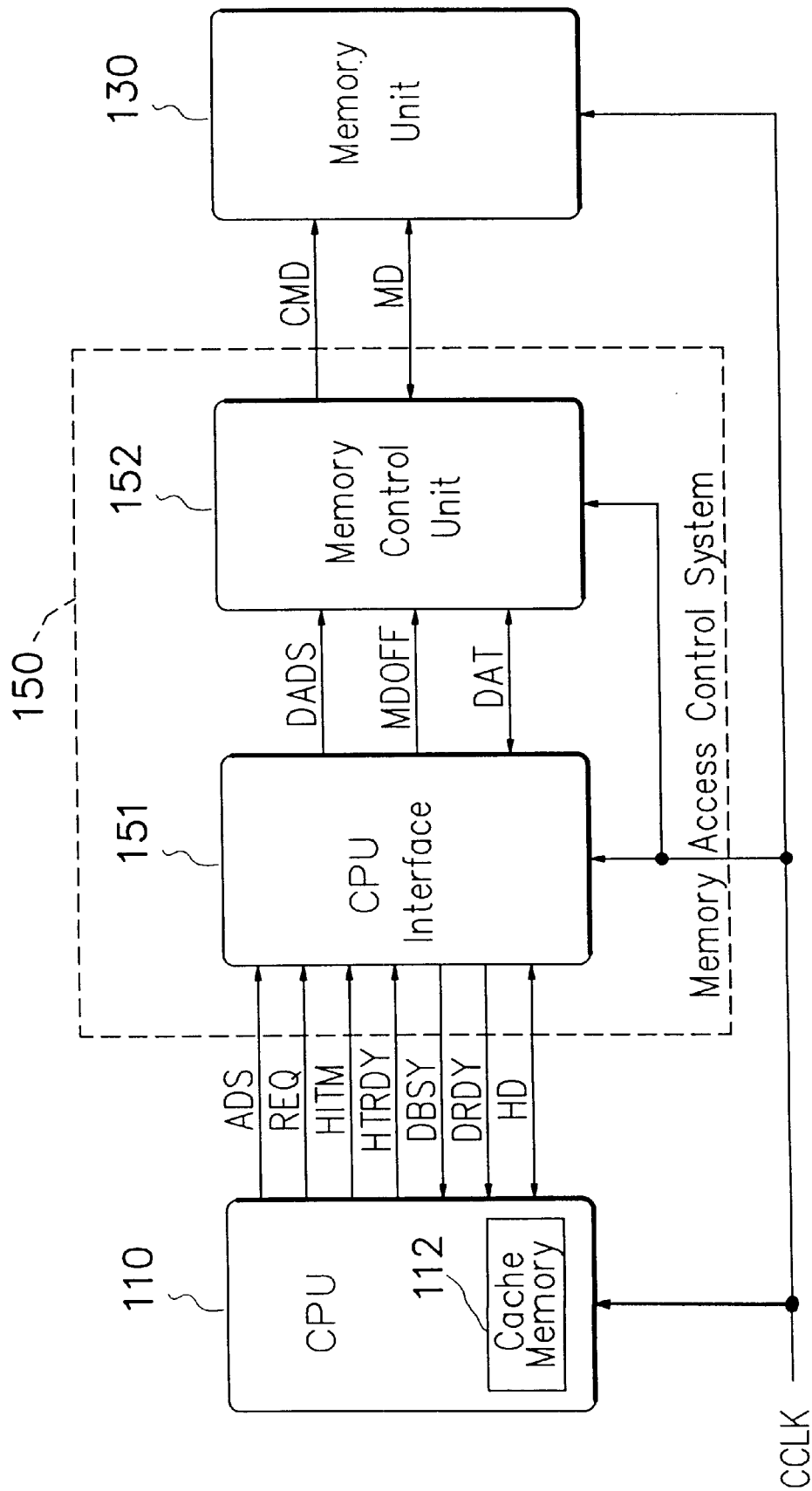
FIG. 2 is a schematic block diagram of the method and system according to the invention for controlling the memory access operation performed by a CPU in a computer system.

FIG. 2 is a schematic block diagram of the memory access control method and system according to the invention, as here indicated by the reference numeral 150, which is designed to control the memory access operation by a CPU (here also indicated by the reference numeral 110) on a memory unit (here also indicated by the reference numeral 130).

The memory access control system 150 of the invention is coupled between the CPU 110 and the memory unit 130 and is composed of a CPU interface 151 and a memory control unit 152. The CPU 110 further includes a cache memory 112. The CPU 110 can be, for example, a Pentium II CPU from the Intel Corporation of U.S.A., while the memory unit 130 can be, for example, an SDRAM.

The CPU 110 and the CPU interface 121 are interconnected via a number of data lines ADS, REQ, HITM, HTRDY, DBSY, DRDY, and HD; the CPU interface 121 and the memory control unit 122 are interconnected via three data lines DADS, MDOFF, and DAT; and the memory control unit 122 and the memory unit 130 are interconnected via two data lines CMD and MD. The system of the invention is distinguished from the prior art of FIG. 1 particularly in the additional provision of the MDOFF data line between the CPU interface 151 and the memory control unit 152.

The CPU 110 can gain access to the memory unit 130 under control of the memory access control system 150. The access operation can be either read, cache write-back, or write. When the CPU 110 wants to gain access to the memory unit 130, it issues access requests to the CPU interface 151. During write operation, the memory control unit 152 is used to control the writing of the output data from the CPU 110 into the memory unit 130; and during read operation, the memory control unit 152 controls the retrieval of the CPU-requested data from the memory unit 130 and then transfers the retrieved data via the CPU interface 151 to the CPU 110.

Figure 1:
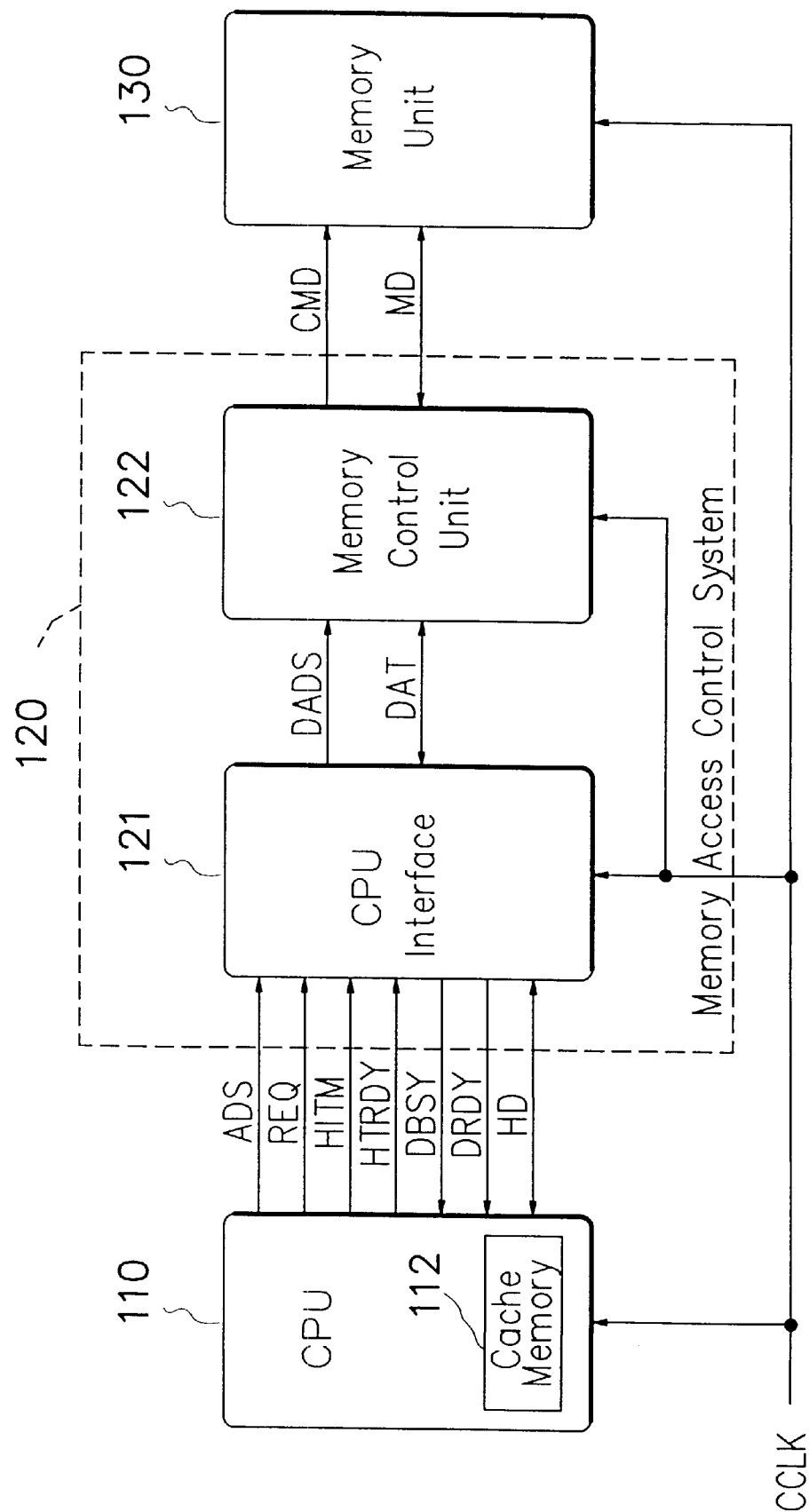
FIG. 1 is a schematic block diagram of a conventional method and system for controlling the memory access operation performed by a CPU in a computer system.

The foregoing system configuration of the method and system of the invention is largely the same as that of the prior art of FIG. 1. However, the method and system of the invention operates in a substantially different manner from the prior art of FIG. 1. In the system configuration of FIG. 2, only major data lines that are related to the spirit and scope of the invention are drawn, and nonessential ones are eliminated for simplification of the drawings and description.

In FIG. 2, all the units are driven by a common clock signal CCLK. The CPU 110 and the CPU interface 151 use the data lines ADS, REQ, HITM, HTRDY, DBSY, DRDY, and HD for data communication therebetween. It is to be noted that, although in FIG. 2 each data line is shown as a single line, it can be actually a data bus consisting of a number of lines. For example, in the case where the CPU 110 is a 64-bit CPU, the HD data line is a bus consisting of 64 lines. Moreover, in the following preferred embodiment, the designation of a LOW-voltage logic state and a HIGH-voltage logic state to a certain signal is an alterable design choice and not intended to limit the scope of the invention.

When the CPU 110 wants to gain access to the memory unit 130, it sets the ADS data line at a LOW-voltage logic state, and whether the access operation is write or read is indicated by the logic voltage state of the REQ data line. Moreover, whether a read request is a hit or a miss to the cache memory 112 is indicated by the logic voltage state of the HITM data line. For instance, if the current read request is a hit, the HITM data line is set at a LOW-voltage logic state, indicating that the cache data in the cache memory 1 12 have been updated and are to be written back to the memory unit 130; and whereas, if a miss, the HITM data line is set at a HIGH-voltage logic state. In the case of a hit, a cache write-back operation is performed to first fetch the cache data via the HTRDY data line and then write the cache data back into the memory unit 130. When the DRDY and DBSY data lines are set at a LOW-voltage logic state, it indicates that the CPU interface 121 wants to transfer data over the HD data line to the CPU 110.

Inside the memory access control system 150, the CPU interface 151 and the memory control unit 152 use the DADS, MDOFF, and DAT data lines for internal data communication therebetween. The DADS signal is a converted version of the ADS signal from the CPU 110. The MDOFF data line is used to transfer a read-stop signal issued by the CPU interface 151 to the memory control unit 152 in response to an L1 write-back signal indicative of a cache hit by the current read request from the CPU 110. The read-stop signal is used to command the memory control unit 152 to stop the current read operation and abandons the currently retrieved data from the memory unit 130 so as to instead perform a cache write-back operation to write the cache data in the cache memory 112 back into the memory unit 130. The DAT data line is used to transfer the data from the CPU 110 that are to be written into the memory unit 130, or the data that are retrieved from the memory unit 130 and to be transferred via the CPU interface 121 to the CPU 110.

The memory control unit 152 and the memory unit 130 use the CMD and MD data lines for data communication therebetween. The CMD data line is used to transfer various control signals to the memory unit 130 under different operations. These control signals include a precharge-enable signal, an activate-enable signal, a read-enable signal, and a write-enable signal. The MD data line is used to transfer the data that are to be written into the memory unit 130 or the retrieved data from the memory unit 130.

Figure 3:
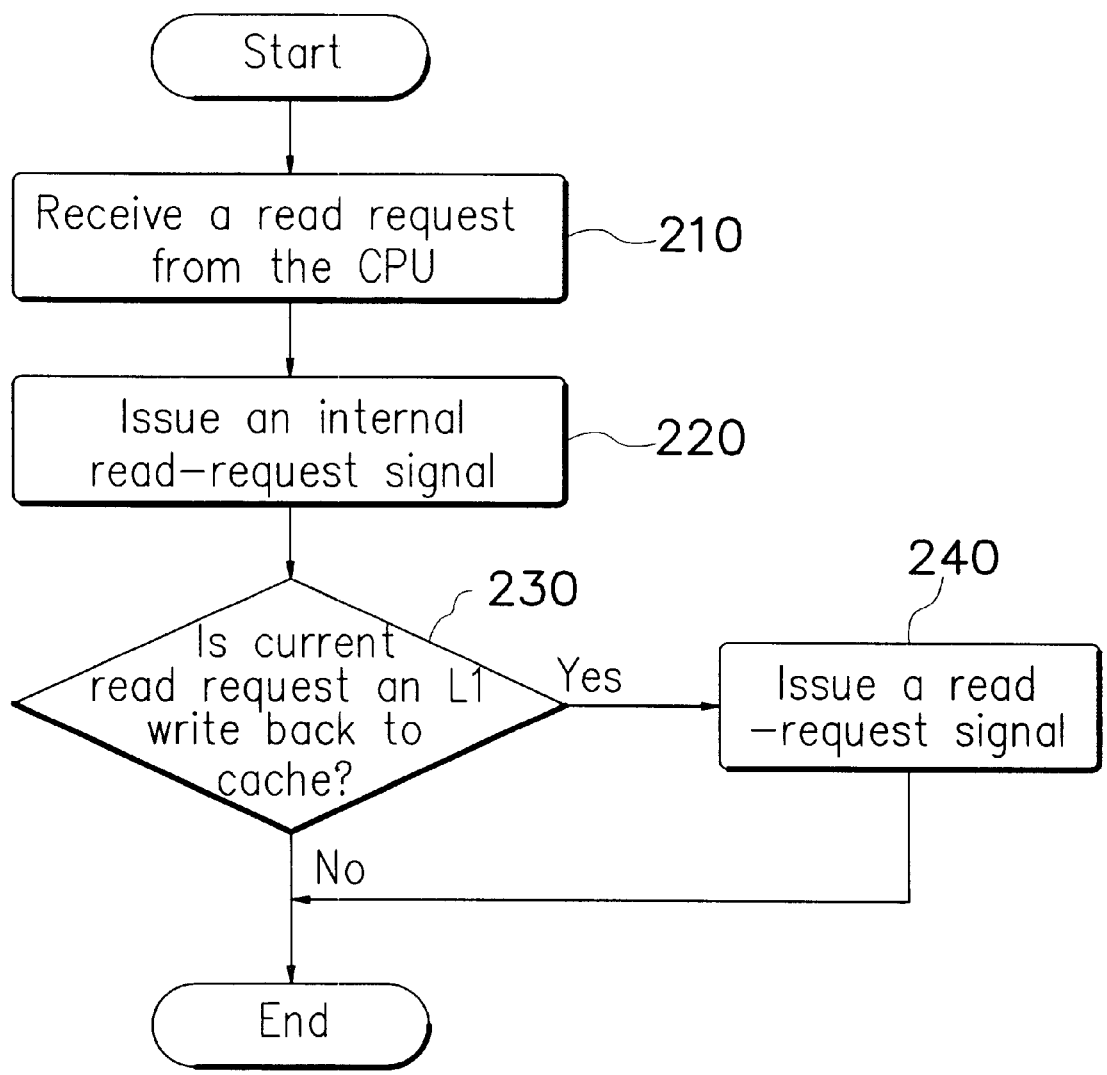
FIG. 3 is a flow diagram of the procedural steps carried out by the CPU interface utilized in the memory access control system shown in FIG. 2.
Figure 4:
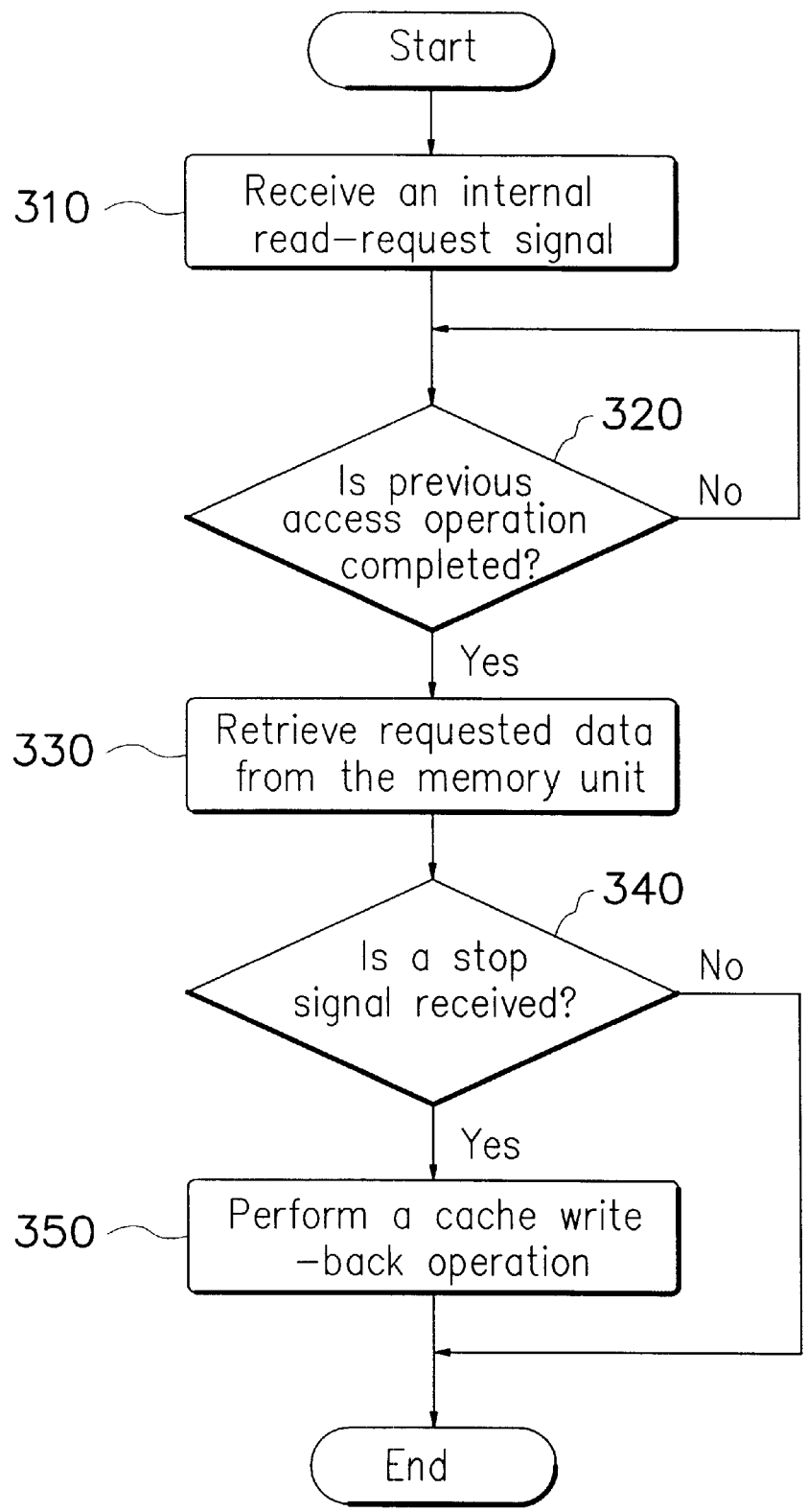
FIG. 4 is a flow diagram of the procedural steps carried out by the memory control unit utilized in the memory access control system shown in FIG. 2.

FIG. 3 is a flow diagram of the procedural steps carried out by the CPU interface 151 in accordance with the invention; and FIG. 4 is a flow diagram of the procedural steps carried out by the memory control unit 152 in accordance with the invention.

Referring to FIG. 3 together with FIG. 2, in the first step 210, the CPU interface 151 receives a read request from the CPU 110 via the ADS and REQ data lines. In most cases, a number of read requests is received successively.

In the next step 220, in response to each read request from the CPU 110, the CPU interface 151 promptly issues a corresponding internal read-request signal via the DADS data line to the memory control unit 152.

In the next step 230, the CPU interface 151 checks whether an L1 write-back signal of the previous read request is received via the HITM data line. If the L1 write-back signal indicates a miss, the procedure is ended, allowing the memory control unit 152 to continue the current read operation on the memory unit 130; whereas, if the L1 write-back signal indicates a hit, the procedure goes to the step 240, in which the CPU interface 151 issues a read-stop signal via the MDOFF data line to the memory control unit 152. In response, the memory control unit 152 stops the current read operation and abandon the currently retrieved data from the memory unit 130 so as to instead perform a cache write-back operation to write cache data in the cache memory 112 back into the memory unit 130.

The actions carried out by the memory control unit 152 in response to the internal read-request signal from the CPU interface 151 are shown in FIG. 4.

As shown, in the first step 310, the memory control unit 152 receives an internal read-request signal from the CPU interface 151 via the DADS data line.

In the next step 320, the memory control unit 152 checks whether the previous memory access operation, which can be either read or write, is completed. If YES, the procedure goes to the step 330; otherwise, if NO, the memory control unit 152 continues the action of the step 320 until the result is YES.

In the step 330, the memory control unit 152 performs a read operation on the memory unit 130 in response to the internal read-request signal from the CPU interface 151. In the case that the memory unit 130 is an SDRAM and provided that the starting address of the current read request is in another closed page other from that accessed by the previous access operation, the memory control unit 152 should first issue a precharge-enable signal and an activate-enable signal to the memory unit 130 for the purpose of opening the page where the requested data are located.

In the step 340, the memory control unit 152 checks whether a read-stop signal is being issued from the CPU interface 151 via the MDOFF data line. If NO, it indicates that current read request is a miss to the cache memory 112; and therefore, the current read operation is continued until all the requested data are retrieved.

In contrast, if a read-stop signal is received, the procedure goes to step 350, in which the memory control unit 152 stops the current read operation and abandons the currently retrieved data so as to instead perform a cache write-back operation to write the cache data in the cache memory 112 back into the memory unit 130.

In the following, some performance comparison examples are used to better explain the advantages of the invention over the prior art. The signal timing diagrams of these examples are respectively shown in FIGS. 5A–5B, FIGS. 6A–6B, FIGS. 7A–7B, FIGS. 8A–8B, FIGS. 9A–9B, FIG. 10, and FIG. 11 (note that FIG. 5A, FIG. 6A, FIG. 7A, FIG. 8A, and FIG. 9A are those of the prior art, which are used for comparison with the invention).

In the following examples, both for the invention and the prior art, it is assumed that the burst length of each read request from the CPU 110 is four blocks of data, and the latency of the memory unit 130 is two clock cycles.

Figure 5A:
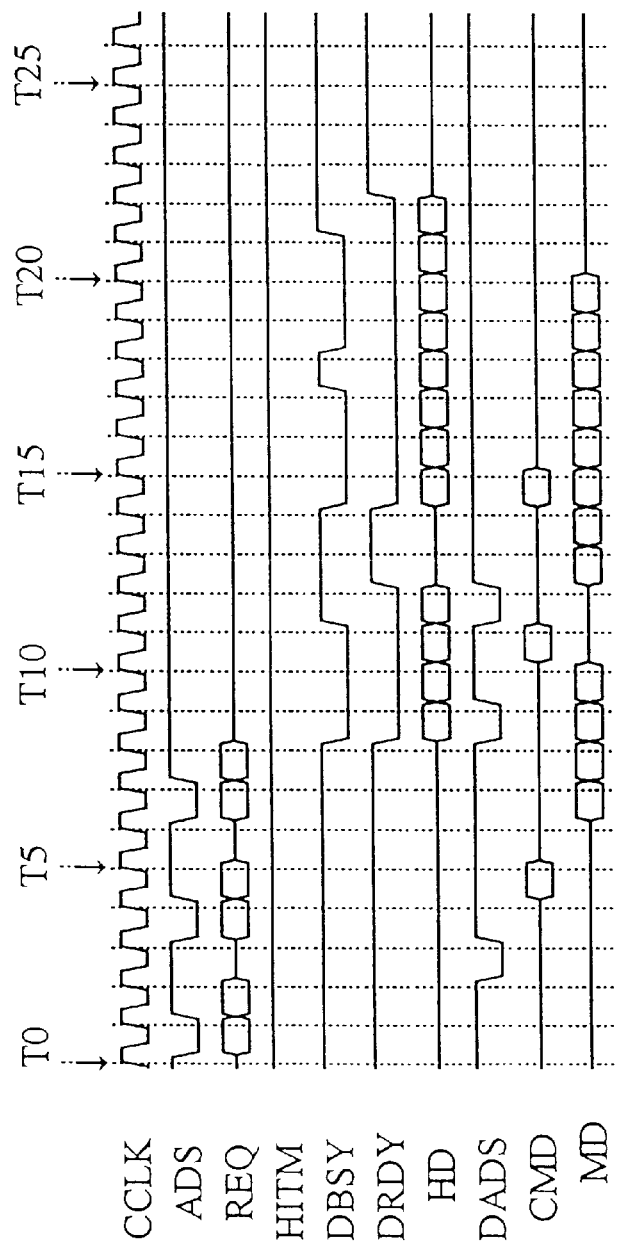
FIGS. 5A–5B are signal timing diagrams of the prior art and the invention, respectively, which are used to depict a first performance comparison example between the invention and the prior art.
Figure 5B:
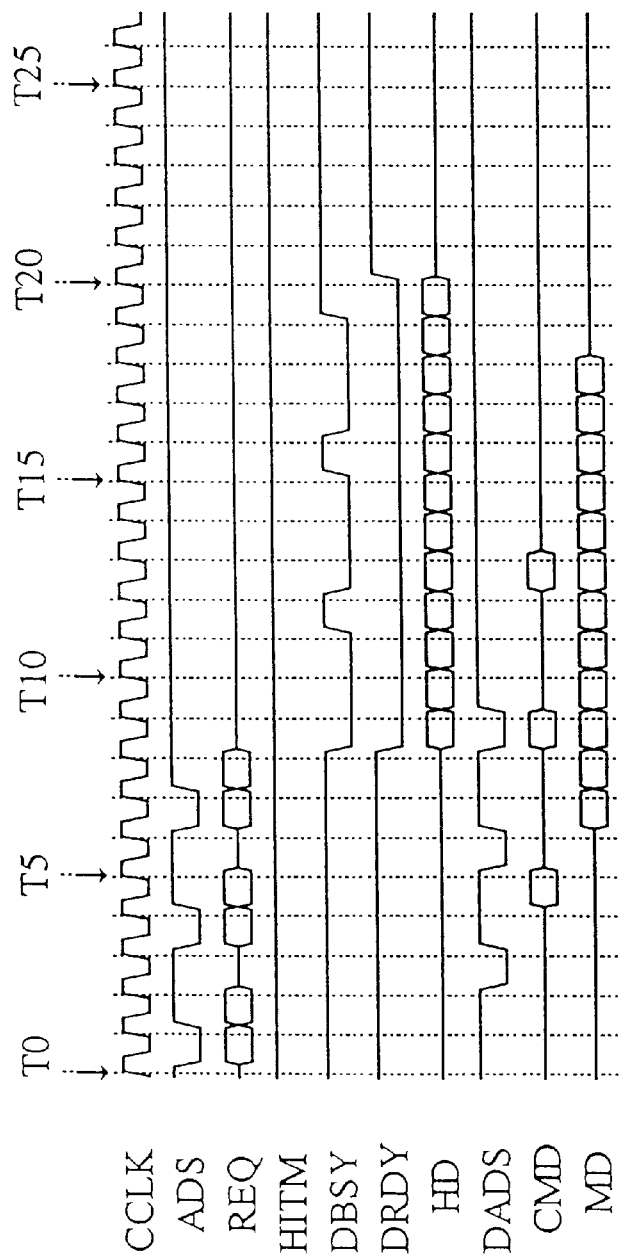

First Performance Comparison Example (FIGS. 5A and 5B)

In the example of FIGS. 5A–5B, it is assumed that the CPU 110 successively issues three read requests, with the data requested by these three read requests all located in the same opened page.

Referring to FIG. 5A (the prior art), in the case of the prior art, the CPU 110 issues the three read requests successively at T1, T4, and T7 via the ADS and REQ data lines. In this situation of FIG. 5A, it is assumed that the CPU 110 issues an L1 write-back signal at four clock cycle later after the read request issued by the CPU. The L1 write-back signal is issued via the HITM data line to the CPU interface 151. For the first read request issued at T1, the L1 write-back signal is necessary to be confirmed at T5; for second the read request issued at T4, its L1 write-back signal is necessary to be confirmed at T8; and for the third read request issued at T7, its L1 write-back signal is necessary to be confirmed at T11.

By the prior art of FIG. 1, when the CPU interface 121 receives the first read request from the CPU 110 at T1, the CPU interface 121 issues the corresponding internal read-request signal, which is assumed to be not a write-back request for a simple purpose of easier descriptions due to a reduced time delay in the timing diagrams, at T3 without waiting until the L1 write-back signal of the first read request is issued. For the second and third read requests issued respectively at T4 and T7, the CPU interface 121 issues the corresponding internal read-request signals respectively in five clock cycles after the read requests are received, i.e., at T9 and T12, respectively.

The memory control unit 122, in response to the first internal read-request signal from the CPU interface 121, first checks that the requested data are located in an opened page; then, after two clock cycles, i.e., at T5, the memory control unit 122 issues a read-enable signal to the memory unit 130. After a latency of two clock cycles, i.e., at T7, the memory unit 130 starts to output the requested four blocks of data via the MD data line. These data are then transferred via the memory access control system 120 to the CPU 110. In response to the second internal read-request signal from the CPU interface 121 at T9, the memory control unit 122 first checks that the requested data are located in the currently opened page; then, after two clock cycles, i.e., at T11, the memory control unit 122 issues a read-enable signal to the memory unit 130. After a latency of two clock cycles, i.e., at T13, the memory unit 130 starts to output the requested four blocks of data via the MD data line. These data are then transferred via the memory access control system 120 to the CPU 110. Furthermore, when the memory control unit 122 receives the third internal read-request signal at T12, it must wait until the previous read action is completed to issue the read-enable signal to the memory unit 130, i.e., at T15 when outputting the third block of data as requested by the second read request is completed. After a latency of two clock cycles, i.e., at T17, the memory unit 130 completes outputting all the four blocks of data as requested by the previous read request and then starts to output the four blocks of data requested by the third read request via the MD data line.

For comparison purposes, the foregoing read requests are performed by the method and system of the invention to compare the difference between performances of the invention and the prior art.

Referring to FIG. 5B, in the case of the invention, the CPU 110 also issues the three read requests successively at T1, T4, and T7 via the ADS and REQ data lines. When the CPU interface 151 receives the first read request from the CPU 110, it issues the corresponding internal read-request signal via the DADS data line to the memory control unit 152 at T3. Subsequently, when the CPU interface 151 receives the second read request, the CPU interface 151 promptly issues the corresponding internal read-request signal in two clock cycles, i.e., at T6, without waiting until the CPU 110 issues the L1 write-back signal of the second read request; and next, in response to the third read request, the CPU interface 151 similarly issues the corresponding internal read-request signal after two clock cycles, i.e., at T9, without waiting until the CPU 110 issues an L1 write-back signal of the third read request.

The memory control unit 152, in response to the first internal read-request signal from the CPU interface 151, first checks that the requested data are located in the currently opened page; then, after two clock cycles, i.e., at T5, the memory control unit 152 issues a read-enable signal via the CMD data line to the memory unit 130. After a latency of two clock cycles, i.e., at T7, the memory unit 130 starts to output the requested four blocks of data via the MD data line to memory control unit 152. At T6, the memory control unit 152 receives the second internal read-request signal from the CPU interface 151. At this time, however, since the previous read action is not yet completed, the memory control unit 152 waits until outputting the third block of data for the previous read request is completed, i.e., at T9, to issue a read-enable signal to the memory unit 130 for the second read request. After a latency of two clock cycles, the memory unit 130 completes outputting the last block of data for the previous read request; then, at T11, the memory unit 130 starts to output the four blocks of data requested by the second read request. At T9, the memory control unit 152 receives the third internal read-request signal from the CPU interface 151. In a similar manner, the memory control unit 152 waits until the memory unit 130 completes outputting the third block of data, i.e., at T13, to issue the third read-enable signal to the memory unit 130. In response, the memory unit 130 waits two clock cycles until all the requested data by the previous read request are retrieved, i.e., at T15, to start outputting the four blocks of data requested by the third read request.

By comparing FIG. 5B with FIG. 5A, it can be seen that the prior art requires a total of 22 clock cycles to complete the overall read operation by the three successively issued read requests. By contrast, the invention requires only 20 clock cycles. It is apparent that the invention is higher in memory access performance than the prior art.

Figure 6A:
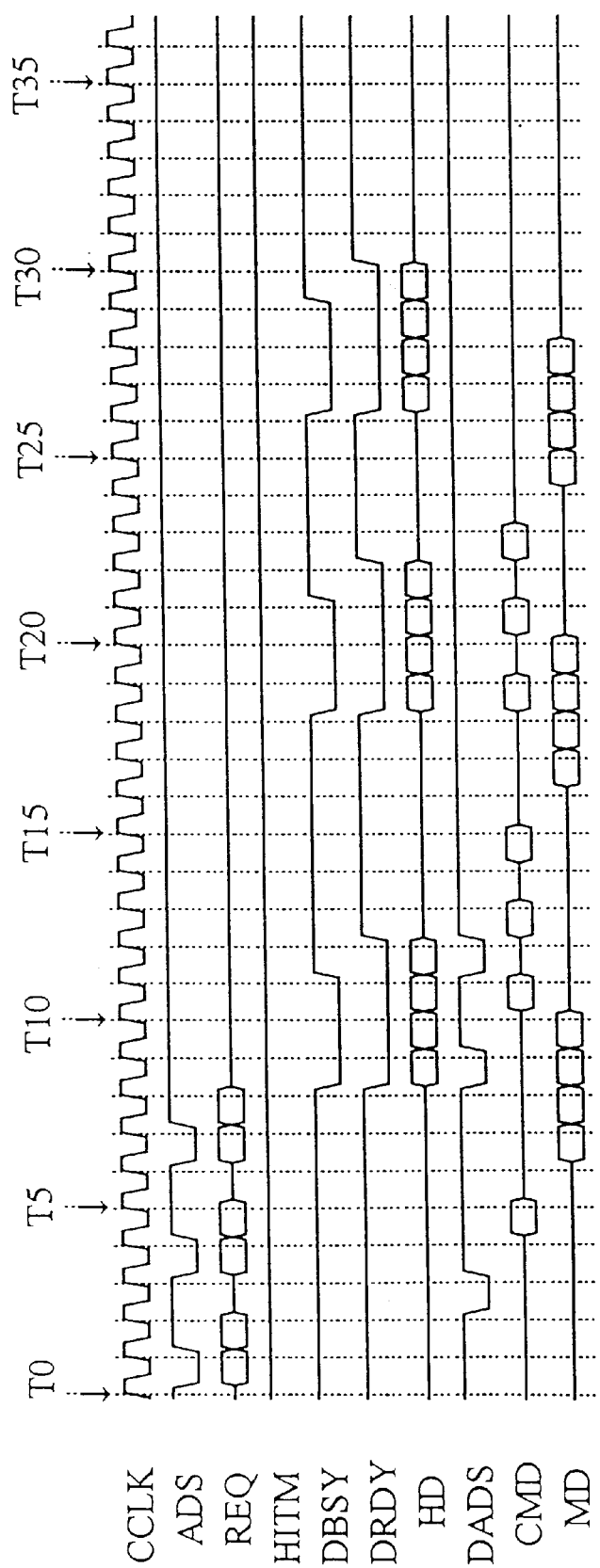
FIGS. 6A–6B are signal timing diagrams of the prior art and the invention, respectively, which are used to depict a second performance comparison example between the invention and the prior art.
Figure 6B:
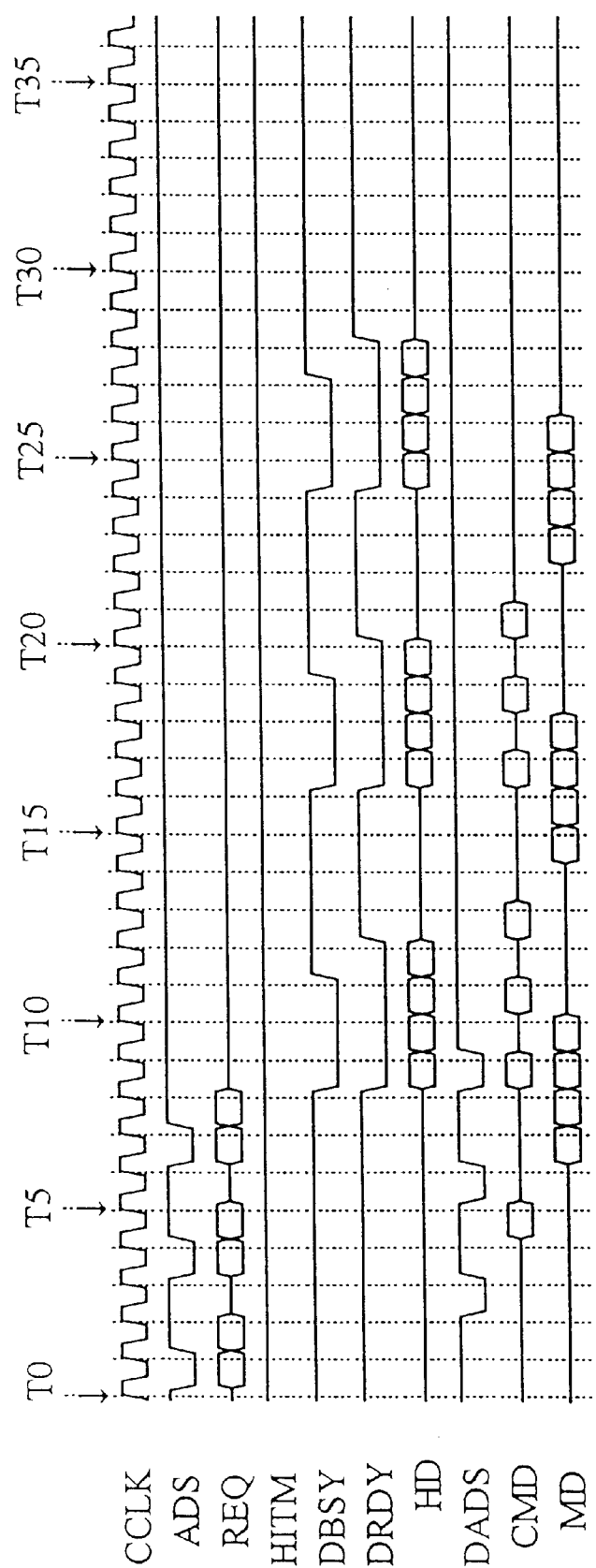

Second Performance Comparison Example (FIGS. 6A and 6B)

In the example of FIGS. 6A–6B, it is assumed that the CPU 110 successively issues three read requests, with the data requested by the first read request being located in a currently opened page and the data requested by the second and third read requests being located in different closed pages.

Referring to FIG. 6A (the prior art), in the case of the prior art, the CPU 110 issues three read requests successively at T1, T4, and T7 via the ADS and REQ data lines. For each read request, the CPU 110 issues an L1 write-back signal indicative of whether the read request is a hit or a miss to the cache memory 112. In response to the first read request, the CPU 110 promptly issues the corresponding internal read-request signal, which is assumed to be not a write-back request for easy descriptions by reducing its time delay in the timing diagrams, to the memory control unit 122 at T3 without waiting until the L1 write-back signal of the first read request is issued. In response to the subsequent second and third read requests, however, the CPU 110 waits until their L1 write-back signals are issued, i.e., at T9 and T12 respectively, to issue the corresponding internal read-request signals to the memory control unit 122.

The memory control unit 122, in response to the first internal read-request signal from the CPU interface 121, first checks that the requested data are located in an opened page in the memory unit 130. Next, after two clock cycles, i.e., at T5, the memory control unit 122 issues a read-enable signal to the memory unit 130. After a latency of two clock cycles, i.e., at T7, the memory unit 130 starts outputting the requested four blocks of data via the MD data line. Thereafter, at T9, the memory control unit 122 receives the second read request from the CPU interface 121. Since the requested data by the second read request are located in a closed page, the memory control unit 122 starts at T11 to issue successively a precharge-enable signal, an activate-enable signal, and a read-enable signal to the memory unit 130, which cause the memory unit 130 to open the page where the requested data are located and then start at T17 to output the requested data. At T12, the memory control unit 122 receives the third internal read-request signal from the CPU interface 121. At this time, however, since the memory control unit 122 is still busy taking care of the second read request, the memory control unit 122 waits until outputting the third block of data as requested by the second read request is completed, i.e., at T19, to start issuing successively a precharge-enable signal, an activate-enable signal, and a read-enable signal to the memory unit 130 for the third read request. Until T25, the memory unit 130 then starts to output the four blocks of data requested by third read request via the MD data line.

For comparison purpose, the foregoing read requests are performed by the method and system of the invention to compare the difference between the performances of the invention and the prior art.

Referring to FIG. 6B, in the case of the invention, the CPU 110 also issues three read requests successively at T1, T4, and T7 via the ADS and REQ data lines. When the CPU interface 151 receives the first read request issued, it issues the corresponding internal read-request signal via the DADS data line to the memory control unit 152 at T3. Subsequently, when the CPU interface 151 receives the second read request at T4, the CPU interface 151 promptly issues the corresponding internal read-request signal via the DADS data line to the memory control unit 152 at T6 without waiting until the CPU 110 issues the L1 write-back signal of the second read request. Next, in response to the third read request, the CPU interface 151 also promptly issues the corresponding internal read-request signal via the DADS data line to the memory control unit 152 at T9.

The memory control unit 152, in response to the first internal read-request signal from the CPU interface 151, first checks that the requested data are located in an opened page. Then, after two clock cycles, i.e., at T5, the memory control unit 152 issues a read-enable signal to the memory unit 130 for the first read request. After a latency of two clock cycles, i.e., at T7, the memory unit 130 starts to output the requested four blocks of data via the MD data line to the memory control unit 152. At T6, the memory control unit 152 receives the second internal read-request signal from the CPU interface 151 and checks that the data requested are located in a closed page. At this time, however, since the previous read action is not yet completed, the memory control unit 152 waits until T9 to start issuing successively a precharge-enable signal, an activate-enable signal, and a read-enable signal to the memory unit 130 for the second read request. In response, the memory unit 130 first opens the page where the data requested by the second read request are located and then starts at T15 to output the requested data. At T9, the memory control unit 152 receives the third internal read-request signal from the CPU interface 151. In a similar manner, the memory control unit 152 waits until the memory unit 130 completes outputting the third block of data, i.e., at T17, to issue successively a precharge-enable signal, an activate-enable signal, and a read-enable signal to the memory unit 130 for the third read request. In response, the memory unit 130 waits two clock cycles until all the requested data by the previous read request are retrieved, i.e., at T23, to start outputting the four blocks of data requested by the third read request.

By comparing FIG. 6B with FIG. 6A, it can be seen that the prior art requires a total of 30 clock cycles to complete the overall read operation by the three successively issued read requests. In contrast, the invention requires only 28 clock cycles. It is apparent that the invention is higher in memory access performance than the prior art.

Figure 7A:
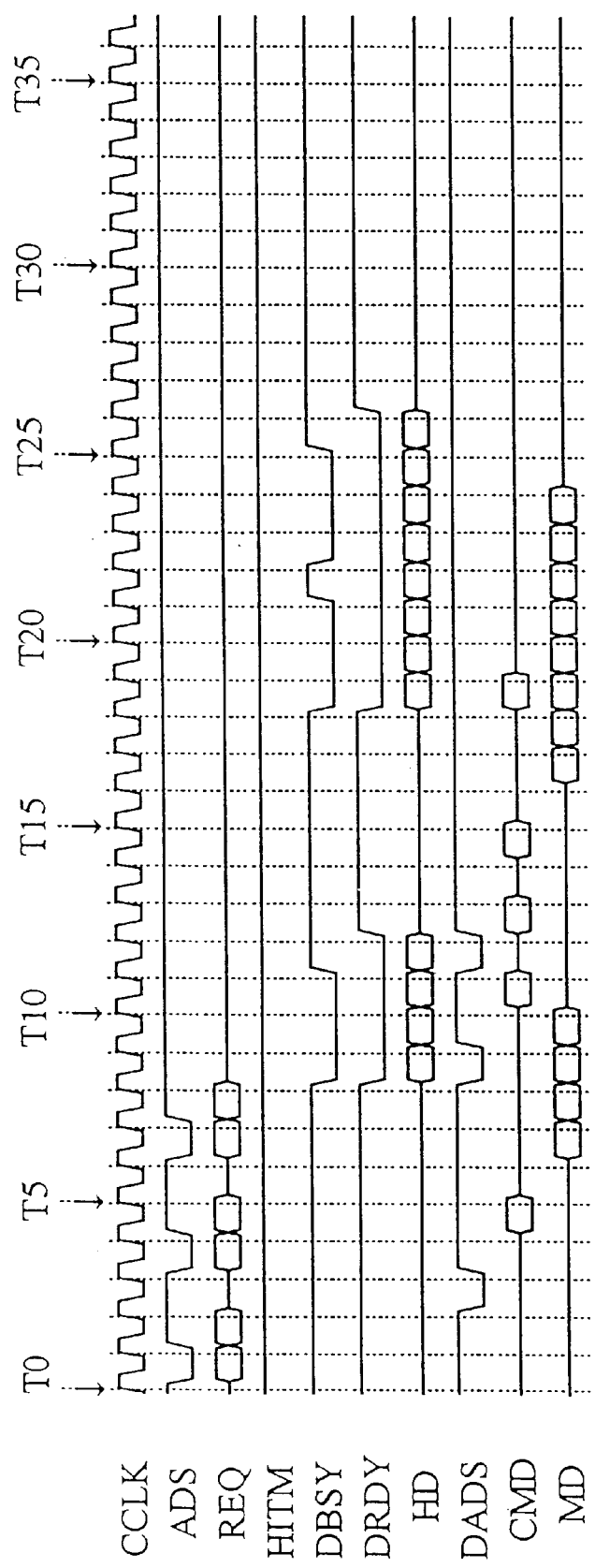
FIGS. 7A–7B are signal timing diagrams of the prior art and the invention, respectively, which are used to depict a third performance comparison example between the invention and the prior art.
Figure 7B:
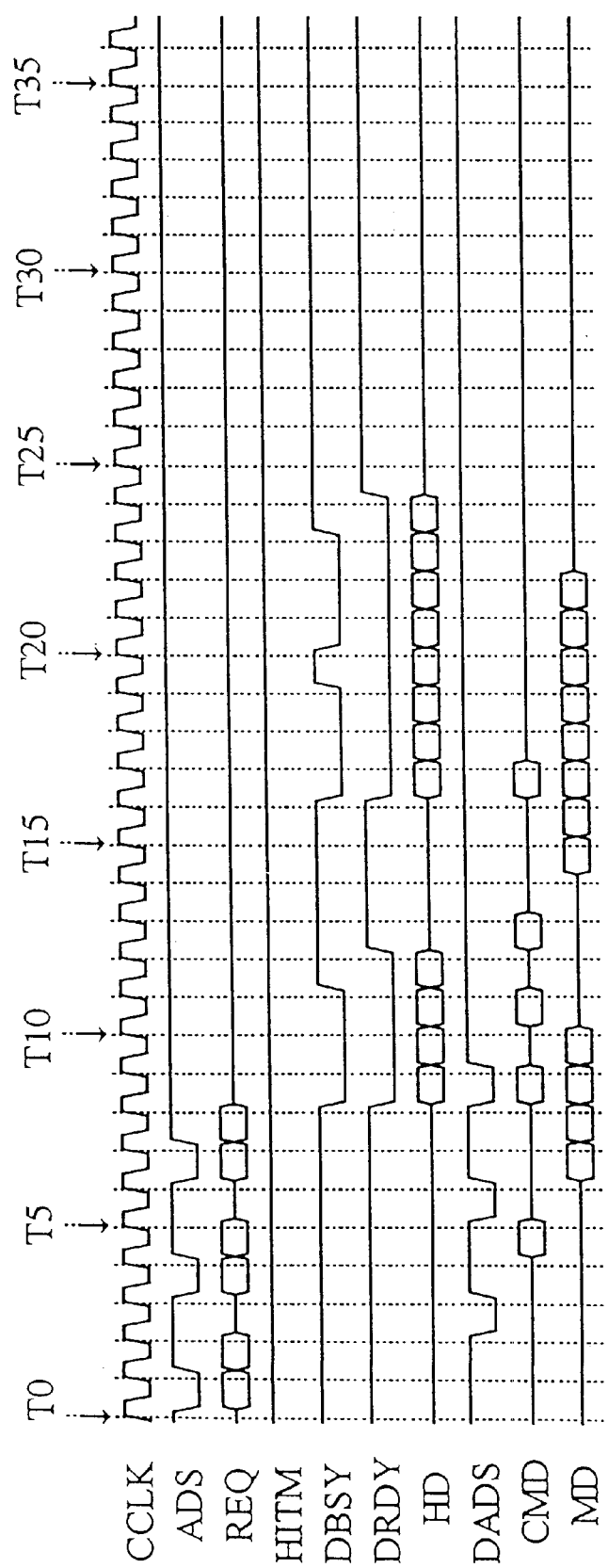

Third Performance Comparison Example (FIGS. 7A and 7B)

In the example of FIGS. 7A–7B, it is assumed that the CPU 110 successively issues three read requests, with the data requested by the first read request being located in an opened page, the data requested by the second read request being located in a different page from the first read request, and the data requested by the third read request being located in the same page where the data requested by the second read request are located.

Referring to FIG. 7A (the prior art), in the case of the prior art, the CPU 110 issues three read requests successively at T1, T4, and T7 via the ADS and REQ data lines. In response to the first read request, the CPU 110 promptly issues at T3 the corresponding internal read-request signal to the memory control unit 122 without waiting until the L1 write-back signal of the first read request is issued. In response to the second and third read request, however, the CPU 110 waits until the L1 write-back signals for the second and third read requests are received, i.e., at T9 and T12 respectively, to issue the corresponding internal read-request signals to the cache memory 112.

The memory control unit 122, in response to the first internal read-request signal from the CPU interface 121, first checks that the requested data are located in an opened page in the memory unit 130. Then, after two clock cycles, i.e., at T5, the memory control unit 122 issues a read-enable signal to the memory unit 130. After a latency of two clock cycles, i.e., at T7, the memory unit 130 starts outputting the requested four blocks of data by the first read request via the MD data line to the memory control unit 122. At T9, the memory control unit 122 receives the second internal read-request signal from the CPU interface 121. Since the requested data are located in a closed page, the memory control unit 122 starts at T11 to issue successively a precharge-enable signal, an activate-enable signal, and a read-enable signal to the memory unit 130 for the second read request. In response to these signals, the memory unit 130 first opens the page where the requested data are located and then starts at T17 to output the requested data. At T12, the memory control unit 122 receives the third internal read-request signal from the CPU interface 121. At this time, however, since the memory control unit 122 is still busy taking care of the previous read request, the memory control unit 122 waits until outputting the third block of data as requested by the previous read request is completed, i.e., at T19, to start issuing a read-enable signal to the memory unit 130. In this case, no precharge-enable signal and activate-enable signal are necessary since the data requested by the third read request are located in the same page where the data requested by the second read request are located. The memory unit 130 then waits two clock cycles until T21 to start outputting the four blocks of data requested by the third read request.

For comparison purpose, the foregoing read requests are performed by the method and system of the invention to compare for the difference between the performances of the invention and the prior art.

Referring to FIG. 7B, in the case of the invention, the CPU 110 also issues three read requests successively at T1, T4, and T7 via the ADS and REQ data lines. When the CPU interface 151 receives the first read request from the CPU 110, it issues the corresponding internal read-request signal via the DADS data line to the memory control unit 152 at T3. Subsequently, when the CPU interface 151 receives the second read request at T4, the CPU interface 151 promptly issues at T6 the corresponding internal read-request signal via the DADS data line to the memory control unit 152 without waiting until the CPU 110 issues the L1 write-back signal of the second read request. Next, in response to the third read request, the CPU interface 151 promptly issues at T9 the corresponding internal read-request signal via the DADS data line to the memory control unit 152 without waiting until the CPU 110 issues the L1 write-back signal of the third read request.

The memory control unit 152, in response to the first internal read-request signal from the CPU interface 151, first checks that the requested data are located in a currently opened page; then, after two clock cycles, i.e., at T5, the memory control unit 152 issues a read-enable signal to the memory unit 130 for the first read request. After a latency of two clock cycles, i.e., at T7, the memory unit 130 starts outputting the requested four blocks of data via the MD data line to memory control unit 152. At T6, the memory control unit 152 receives the second internal read-request signal from the CPU interface 151. In response, the memory control unit 152 first checks that the requested data are located in a closed page. At this time, however, since the previous read action is not yet completed, the memory control unit 152 waits until T9 to start issuing successively a precharge-enable signal, an activate-enable signal, and a read-enable signal to the memory unit 130 for the second read request. In response to these signals, the memory unit 130 first opens the page where the data of the second read request are located and then starts at T15 to output the requested data. At T9, the memory control unit 152 receives the third internal read-request signal from the CPU interface 151. At this time, the memory control unit 152 must wait until the memory unit 130 completes outputting the third block of data as requested by the previous read request, i.e., at T17, to issue a read-enable signal to the memory unit 130 for the third read request. In this case, no precharge-enable signal and activate-enable signal are necessary since the data requested by the third read request are located in the same page where the data requested by the second read request are located. After a latency of two clock cycles, i.e., until T19, the memory unit 130 is then started to output the four blocks of data requested by the third read request.

By comparing FIG. 7B with FIG. 7A, it can be seen that the prior art requires a total of 26 clock cycles to complete the overall read operation by the three successively issued read requests. By contrast, the invention requires only 24 clock cycles. It is apparent that the invention is higher in memory access performance than the prior art.

Figure 8A:
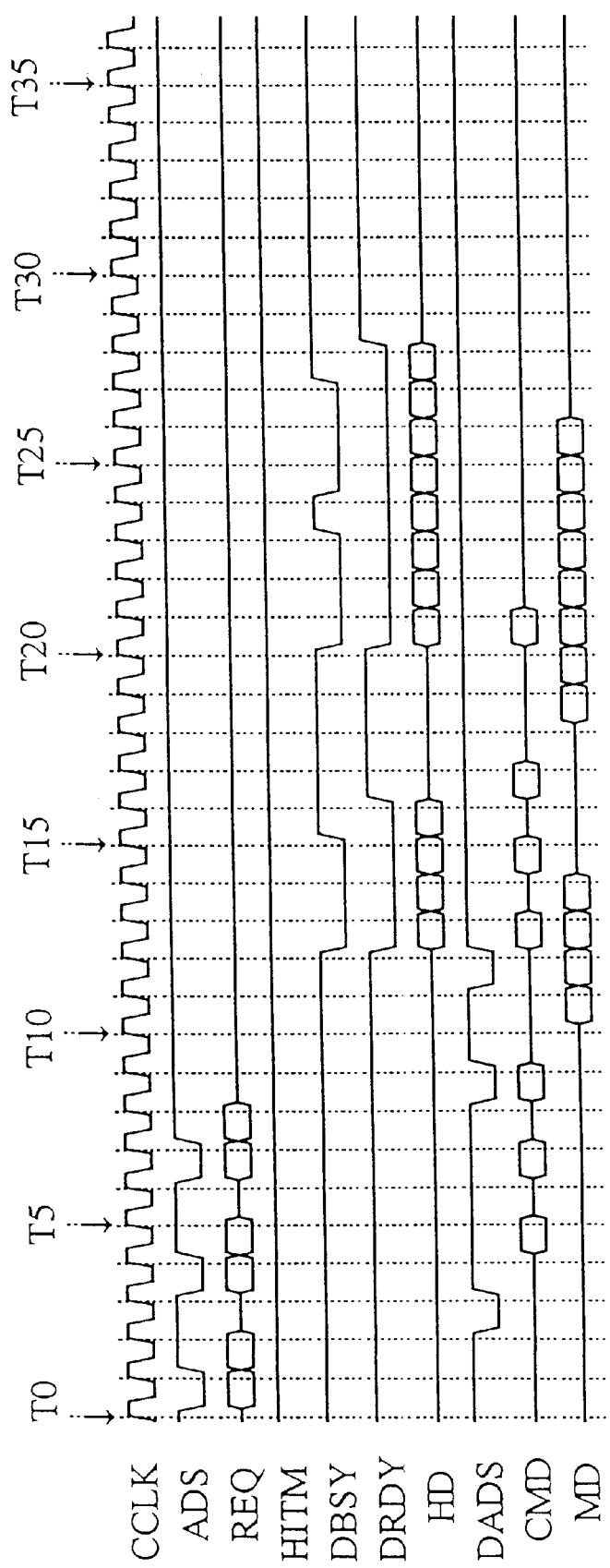
FIGS. 8A–8B are signal timing diagrams of the prior art and the invention, respectively, which are used to depict a fourth performance comparison example between the invention and the prior art.
Figure 8B:
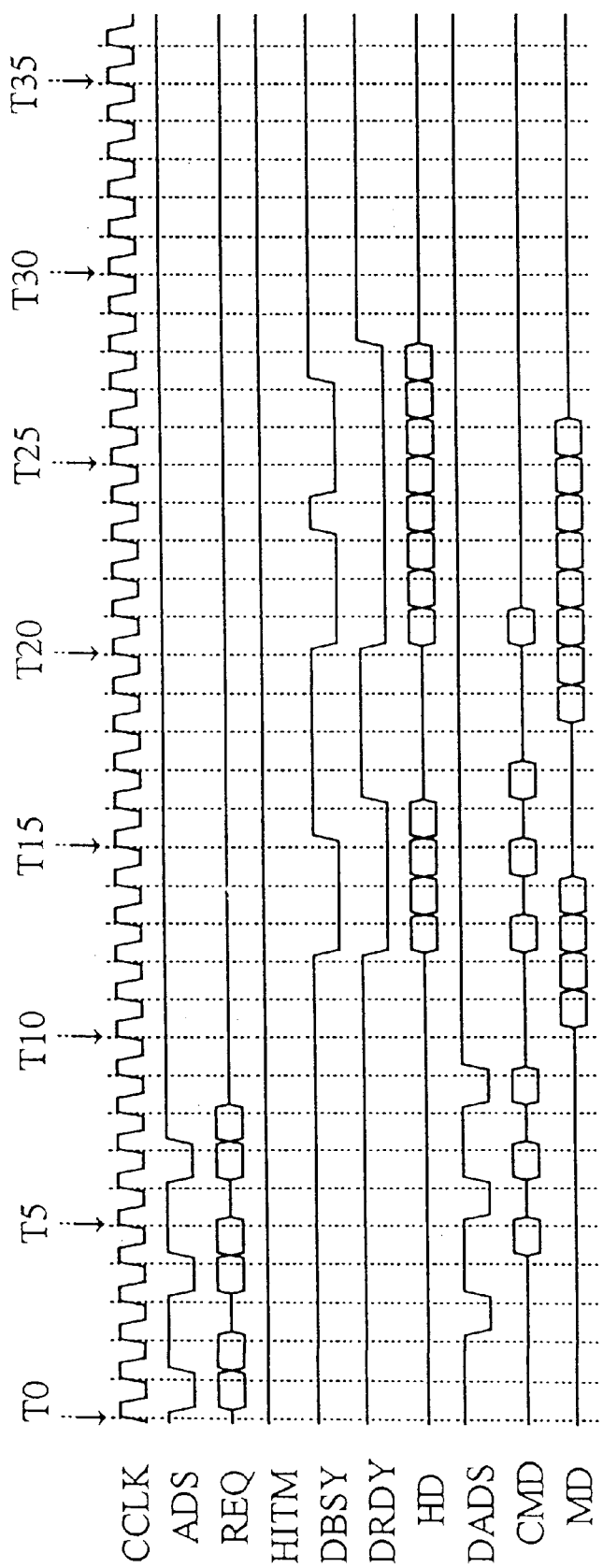

Fourth Performance Comparison Example (FIGS. 8A and 8B)

In the example of FIGS. 8A–8B, it is assumed that the CPU 110 successively issues three read requests, with the data requested by the first and second read requests being located in closed pages, and the data requested by the third read request being located in the same page where the data requested by the second read request are located.

Referring to FIG. 8A (the prior art), in the case of the prior art, the CPU 110 issues three read requests successively at T1, T4, and T7 via the ADS and REQ data lines. In response to the first read request from the CPU 110, the CPU interface 121 promptly issues at T3 the corresponding internal read-request signal to the memory control unit 122 without waiting until the CPU 110 issues the L1 write-back signal of the first read request. In response to the second and third read requests, however, the CPU interface 121 waits until the CPU 110 issues the L1 write-back signals of the second and third read requests, i.e., at T9 and T12, respectively, to issue the corresponding internal read-request signals to the memory control unit 122.

The memory control unit 122, in response to the first internal read-request signal from the CPU interface 121, first checks that the requested data are located in a closed page in the memory unit 130. Subsequently, after two clock cycles, i.e., at T5, the memory control unit 122 issues successively a precharge-enable signal, an activate-enable signal, and a read-enable signal to the memory unit 130 for the first read request. In response to these signals, the memory unit 130 first opens the page where the requested data are located. Then, after a latency of two clock cycles, i.e., at T11, the memory unit 130 starts outputting the requested four blocks of data via the MD data line to the memory control unit 122. At T9, the memory control unit 122 receives the second internal read-request signal from the CPU interface 121 and checks that the requested data are located in a closed page. At this time, however, since the memory control unit 122 is still busy taking care of the previous read request, the memory control unit 122 waits until T13 to issue successively a precharge-enable signal, an activate-enable signal, and a read-enable signal to the memory unit 130 for the second read request. In response to these signals, the memory unit 130 first opens the page where the requested data are located and then starts at T19 to output the requested data. At T12, the memory control unit 122 receives the third internal read-request signal from the CPU interface 121. At this time, however, since the memory control unit 122 is still busy taking care of the previous read request, the memory control unit 122 waits until outputting the third block of data as requested by the previous read request is completed, i.e., until T21, to start issuing a read-enable signal to the memory unit 130. In this case, no precharge-enable signal and activate-enable signal are necessary since the data requested by the third read request are located in the same page where the data requested by the second read request are located. The memory unit 130 then waits two clock cycles until T23 to start outputting the four blocks of data requested by the third read request.

For comparison purpose, the foregoing read requests are performed by the method and system of the invention to compare the difference in the performances of the invention and the prior art.

Referring to FIG. 8B, in the case of the invention, the CPU 110 also issues three read requests successively at T1, T4, and T7 via the ADS and REQ data lines. When the CPU interface 151 receives the first read request from the CPU 110, it issues the corresponding internal read-request signal via the DADS data line to the memory control unit 152 at T3. Subsequently, when the CPU interface 151 receives the second read request from the CPU 110, the CPU interface 151 promptly issues the corresponding internal read-request signal via the DADS data line to the memory control unit 152 at T6 without waiting until the CPU 110 issues the L1 write-back signal of the second read request; and subsequently, in response to the third read request, the CPU interface 151 promptly issues at T9 the corresponding internal read-request signal via the DADS data line to the memory control unit 152 without waiting until the CPU 110 issues the L1 write-back signal of the third read request.

The memory control unit 152, in response to the first internal read-request signal from the CPU interface 151, first checks that the requested data are located in a closed page in the memory unit 130. Then, after two clock cycles, i.e., at T5, the memory control unit 152 issues successively a precharge-enable signal, an activate-enable signal, and a read-enable signal to the memory unit 130 for the first read request. In response to these signals, the memory unit 130 first opens the page where the requested data are located; and then, after a latency of two clock cycles, i.e., at T11, the memory unit 130 starts outputting the requested four blocks of data via the MD data line to memory control unit 152. At T6, the memory control unit 152 receives the second internal read-request signal from the CPU interface 151 and checks that the requested data are located in another closed page. At this time, however, since the previous read action is not yet completed, the memory control unit 152 waits until T13 to start issuing successively a precharge-enable signal, an activate-enable signal, and a read-enable signal to the memory unit 130 for the second read request. In response, the memory unit 130 first opens the page where the data of the second read request are located and then starts at T19 to output the requested data. At T9, the memory control unit 152 receives the third internal read-request signal from the CPU interface 151. At this time, however, since the memory control unit 152 is still busy taking care of the previous read request, the memory control unit 152 waits until the memory unit 130 completes outputting the third block of data as requested by the previous read request, i.e., at T21, to issue a read-enable signal to the memory unit 130 for the third read request. In this case, no precharge-enable signal and activate-enable signal are necessary since the data requested by the third read request are located in the same page where the data requested by the second read request are located. In response, however, the memory unit 130 waits a latency of two clock cycles, i.e., until T23, to start outputting the four blocks of data requested by the third read request.

By comparing FIG. 8B with FIG. 8A, it can be seen that the prior art requires a total of 28 clock cycles to complete the overall read operation by the three successively issued read requests. Similarly, the invention also requires 28 clock cycles to complete the overall read operation. The invention is therefore equal in memory access performance to the prior art, in this case.

Figure 9A:
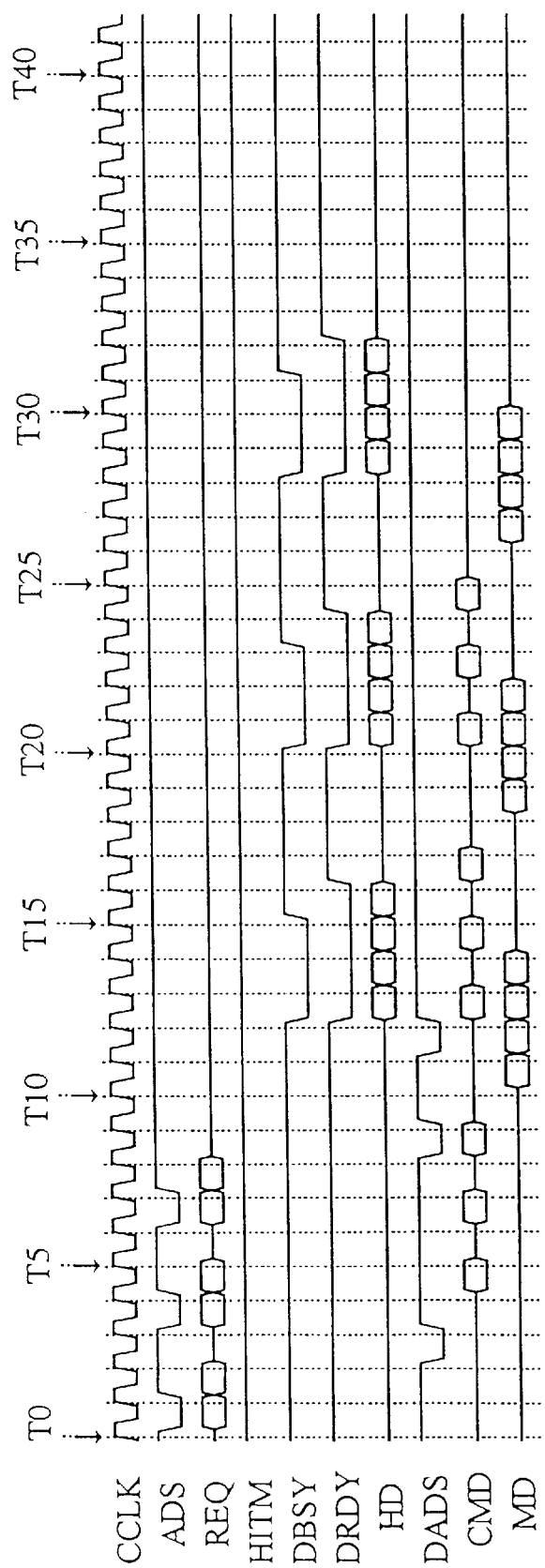
FIGS. 9A–9B are signal timing diagrams of the prior art and the invention, respectively, which are used to depict a fifth performance comparison example between the invention and the prior art.
Figure 9B:
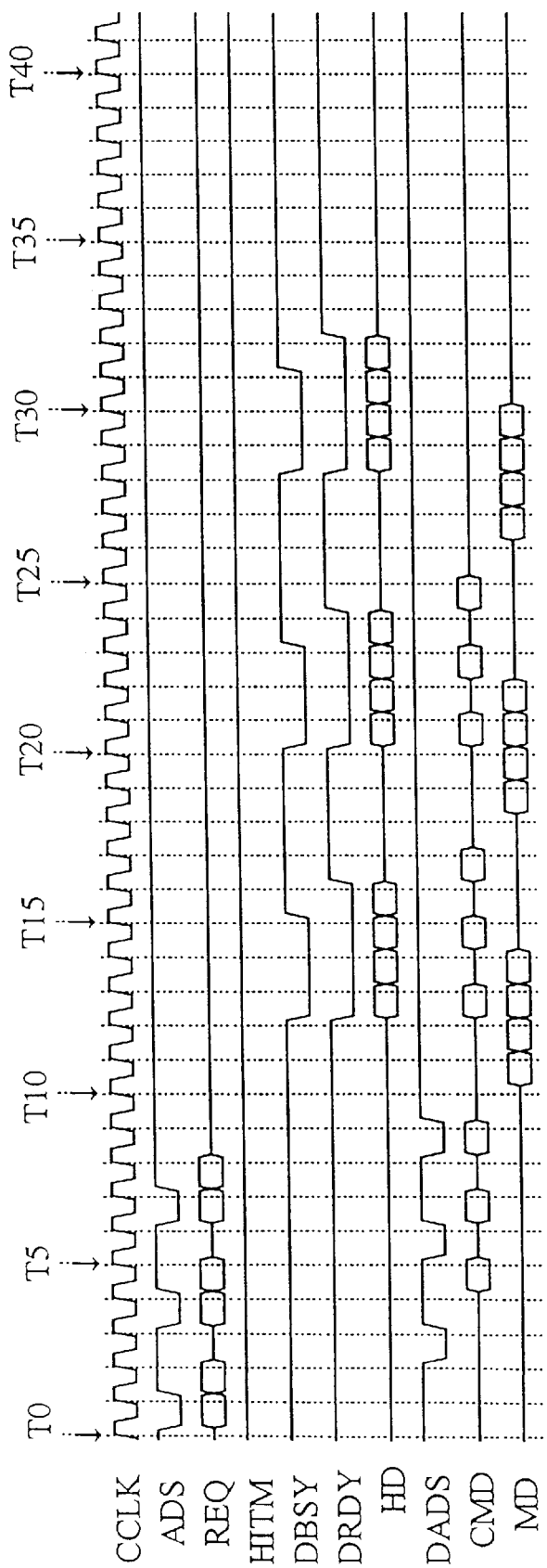

Fifth Performance Comparison Example (FIGS. 9A and 9B)

In the example of FIGS. 9A–9B, it is assumed that the CPU 110 successively issues three read requests, with the data requested by these three read requests all being located in closed pages.

Referring to FIG. 9A (the prior art), in the case of the prior art, the CPU 110 issues three read requests successively at T1, T4, and T7 via the ADS and REQ data lines. In response to the first read request, the CPU interface 121 promptly issues at T3 the corresponding internal read-request signal to the memory control unit 122 without waiting until the CPU 110 issues the L1 write-back signal of the first read request. In response to the second and third read request, however, the CPU 110 waits until the L1 write-back signals of the second and third read requests are received, i.e., respectively at T9 and T12, to issue the corresponding internal read-request signals to the cache memory 112.

The memory control unit 122, in response to the first internal read-request signal from the CPU interface 121, first checks which closed page in the memory unit 130 the requested data are located. Then, after two clock cycles, i.e., at T5, the memory control unit 122 successively issues a precharge-enable signal, an activate-enable signal, and a read-enable signal to the memory unit 130. In response to these signals, the memory unit 130 first opens the page where the requested data are located; then, after a latency of two clock cycles, i.e., at T11, the memory unit 130 starts outputting the four blocks of data requested by the first read request via the MD data line to the memory control unit 122. At T9, the memory control unit 122 receives the second read request from the CPU interface 121 and then checks that the requested data are located in another closed page. At this time, however, since the memory control unit 122 is still busy taking care of the previous read request, the memory control unit 122 waits until T13 to issue successively a precharge-enable signal, an activate-enable signal, and a read-enable signal to the memory unit 130 for the second read request. In response to these signals, the memory unit 130 first opens the page where the requested data are located and then starts at T19 to output the requested data. At T12, the memory control unit 122 receives the third internal read-request signal from the CPU interface 121. At this time, however, since the memory control unit 122 is still busy taking care of the previous read request, the memory control unit 122 waits until outputting the third block of data as requested by the previous read request is completed, i.e., until T21, to start issuing successively a precharge-enable signal, an activate-enable signal, and a read-enable signal to the memory unit 130 for the third read request. In response to these signals, the memory unit 130 first opens the page where the requested data are located and then starts at T27 to output the four blocks of data requested by the third read request.

For comparison purpose, the foregoing read requests are performed by the method and system of the invention to compare the differences between the performances of the invention and the prior art.

Referring to FIG. 9B, in the case of the invention, the CPU 110 also issues three read requests successively at T1, T4, and T7 via the ADS and REQ data lines. When the CPU interface 151 receives the first read request, it issues the corresponding internal read-request signal via the DADS data line to the memory control unit 152 at T3. Subsequently, when the CPU interface 151 receives the second read request, the CPU interface 151 promptly issues the corresponding internal read-request signal via the DADS data line to the memory control unit 152 at T6 without waiting until the CPU 110 issues the L1 write-back signal of the second read request. Next, in response to the third read request from the CPU 110, the CPU interface 151 promptly issues at T9 the corresponding internal read-request signal via the DADS data line to the memory control unit 152 without waiting until the CPU 110 issues the L1 write-back signal of the third read request.

The memory control unit 152, in response to the first internal read-request signal from the CPU interface 151, first checks which closed page the requested data are located; then, after two clock cycles, i.e., at T5, the memory control unit 152 starts issuing successively a precharge-enable signal, an activate-enable signal, and a read-enable signal to the memory unit 130 for the first read request. In response to these signals, the memory unit 130 first opens the page where the requested data are located; and then, after a latency of two clock cycles, i.e., at T11, the memory unit 130 starts outputting the requested four blocks of data via the MD data line to memory control unit 152. At T6, the memory control unit 152 receives the second internal read-request signal from the CPU interface 151 and checks that the requested data are located in another closed page. At this time, however, since the previous read action is not yet completed, the memory control unit 152 waits until T13 to start issuing successively a precharge-enable signal, an activate-enable signal, and a read-enable signal to the memory unit 130 for the second read request. In response to these signals, the memory unit 130 first opens the page where the data of the second read request are located and then starts at T19 to output the requested data. At T9, the memory control unit 152 receives the third internal read-request signal from the CPU interface 151. At this time, however, since the memory control unit 152 is still busy taking care of the previous read request, the memory control unit 152 waits until the memory unit 130 completes outputting the third block of data as requested by the previous read request, i.e., at T21, to issue successively a precharge-enable signal, an activate-enable signal, and a read-enable signal to the memory unit 130 for the third read request. In response, the memory unit 130 first opens the page where the located data are located, and then waits a latency of two clock cycles after the read-enable signal is received, i.e., until T23, to start outputting the four blocks of data requested by the third read request.

By comparing FIG. 9B with FIG. 9A, it can be seen that the prior art requires a total of 31 clock cycles to complete the overall read operation by the three successively issued read requests. Similarly, the invention also requires the same 31 clock cycles to complete the overall read operation. The invention is therefore equal to the prior art in memory access performance, in this case.

In the foregoing five examples, the invention is either better than, or at least equal to, the prior art memory access performance. generally speaking, the invention is better in averaged performance than the prior art and is thus more advantageous than the prior art.

Cache Write-back Operation

It is a characteristic feature of the invention that, for each read request from the CPU 110, the CPU interface 151 promptly issues the corresponding internal read-request signal to the memory control unit 152 before the CPU 110 issues the L1 write-back signal indicative of whether the read request is a hit or a miss to the cache memory 112. In the case were the CPU interface 151 receives an L1 write-back signal indicating that the current read request is a hit to the cache memory 112, the read operation for the current read request is promptly stopped and then a cache write-back operation is performed to write the cache data back to the memory unit 130. Two examples of the cache write-back operation are described in the following with reference to FIG. 10 and FIG. 11.

Figure 10:
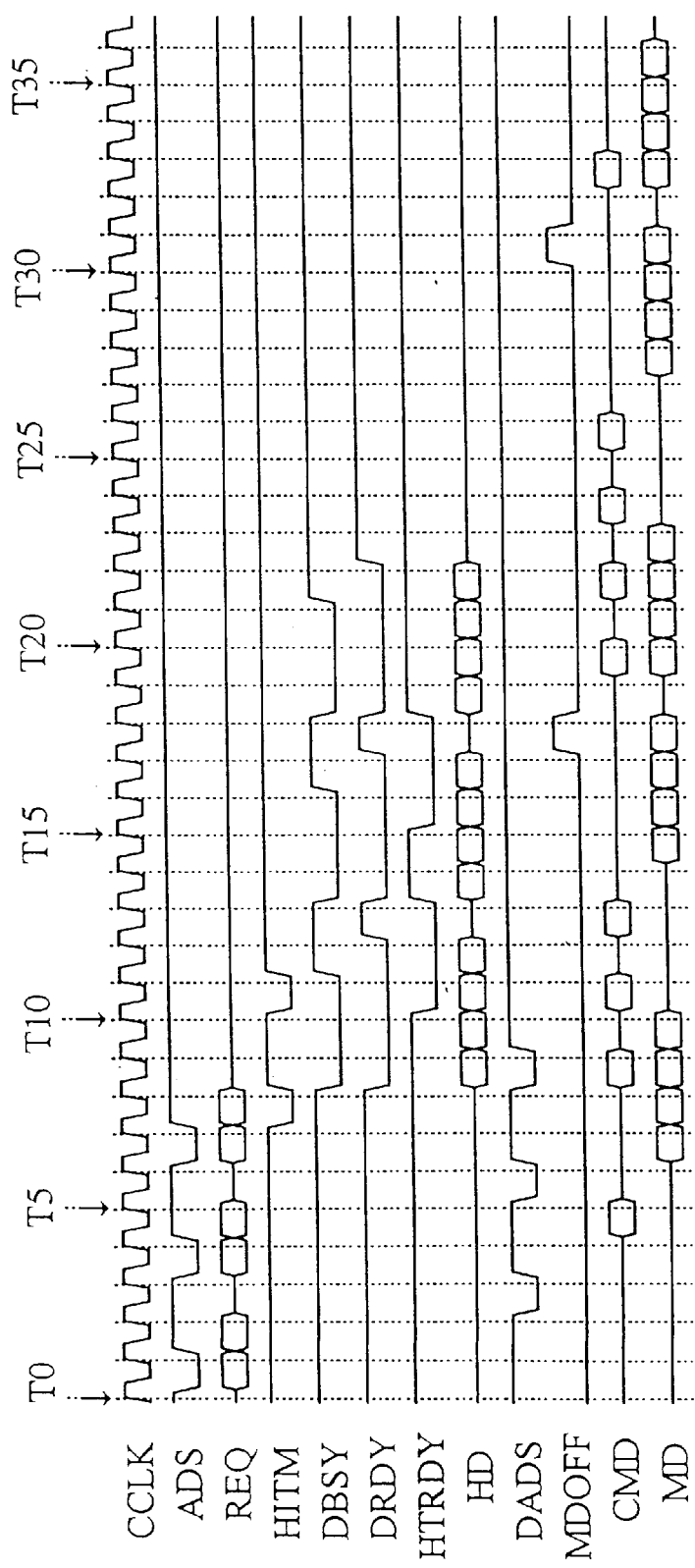
FIG. 10 is a signal timing diagram used to depict a first example of cache write-back operation performed by the method and system of the invention of the invention.

First Example of Cache Write-back Operation (FIG. 10)

In the example of FIG. 10, it is assumed that the CPU 110 successively issues three read requests, with the second and third read requests being each a hit to the cache memory 112, and that the data requested by the first read request are located in an opened page, and the data requested by the second and third read requests are located in different pages.

Referring to FIG. 10, assume the CPU 110 successively issues three read requests at T1, T4, and T7 via the ADS and REQ data lines, wherein the second and the third read requests are each a hit to the cache memory 112. For the second read request, the CPU 110 issues at T8 the L1 write-back signal of the second read request via the HITM data line; and then at T14, the cache data that are to be written back to the memory unit 130 are transferred via the HD data line to the CPU interface 151. At T11, the CPU 110 issues the L1 write-back signal of the third read request; and then, at T19, the cache data that are to be written back to the memory unit 130 are transferred via the HD data line to the CPU interface 151. When the CPU interface 151 receives the first read request at T1, it issues at T3 the corresponding internal read-request signal via the DADS data line to the memory control unit 152. Subsequently, when the CPU interface 151 receives the second read request at T4, the CPU interface 151 promptly issues at T6 the corresponding internal read-request signal via the DADS data line to the memory control unit 152 without waiting until the CPU 110 issues the L1 write-back signal of the second read request. Next, in response to the third read request from the CPU 110, the CPU interface 151 promptly issues at T9 the corresponding internal read-request signal via the DADS data line to the memory control unit 152 without waiting until the CPU 110 issues the L1 write-back signal of the third read request. During this read operation, the L1 write-back signal of each read request is issued after the corresponding internal read-request signal is issued. Therefore, at the next clock cycle after the memory control unit 152 completes outputting the last block of data for the second read request, the CPU interface 151 issues a read-stop signal via the MDOFF data line to the memory control unit 152. Similarly, in response to the L1 write-back signal of the next read request, the memory control unit 152 issues a read-stop signal via the MDOFF data line to the memory control unit 152 at the next clock cycle after the memory control unit 152 completes outputting the last block of data as requested by the third read request.

The memory control unit 152, in response to the first internal read-request signal from the CPU interface 151, first checks that the requested data are located in an opened page. Then, at T5, the memory control unit 152 issues a read-enable signal to the memory unit 130 for the first read request. In response, the memory unit 130 starts at T7 to output the requested four blocks of data via the MD data line to memory control unit 152. When the memory unit 130 completes outputting the third block of data, the memory control unit 152 starts to issue successively a precharge-enable signal, an activate-enable signal, and a read-enable signal to the memory unit 130 for the second read request. In response to these signals, the memory unit 130 first opens the page where the requested data are located and then starts at T15 to output the requested data. When outputting the last block of data is completed, however, the read-stop signal from the CPU interface 151 is received, which causes the memory control unit 152 to abandon the received data, and then issues at T20 a write-enable signal to the memory unit 130, causing the cache data from the cache memory 112 of the CPU 110 to be written back to the memory unit 130. At T22, when the third block of data is being written back into the memory unit 130, the memory control unit 152 successively issues a precharge-enable signal, an activate-enable signal, and a read-enable signal for the third read request. In response, the memory unit 130 starts at T28 to output the requested data. However, at the time when the memory control unit 152 receives the last block of data from the memory unit 130, it also receives the read-stop signal from the CPU interface 151. The read-stop signal causes the memory control unit 152 to abandon the received last block of data and then issue at T33 a write-enable signal to the memory unit 130, causing the cache data from the cache memory 112 of the CPU 110 to be written back to the memory unit 130.

Figure 11:
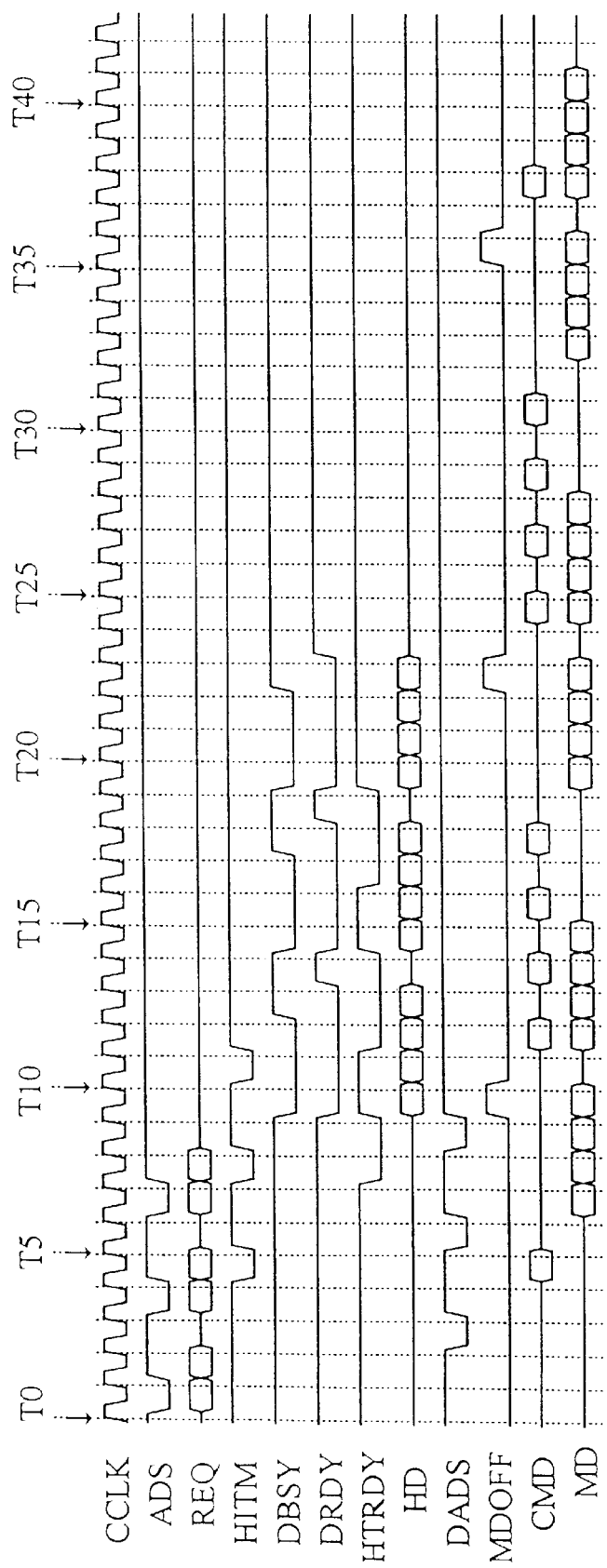
FIG. 11 is a signal timing diagram used to depict a second example of cache write-back operation performed by the method and system of the invention of the invention.

Second Example of Cache Write-back Operation (FIG. 11)

In the example of FIG. 11, it is assumed that the CPU 110 successively issues three read requests, with all of these three read requests being each a hit to the cache memory 112, and that the data requested by the first read request are located in an opened page, and the data requested by the second and third read requests are located in different pages.

Referring to FIG. 11, assume that the CPU 110 issues three read requests successively at T1, T4, and T7 via the ADS and REQ data lines, and that all of these three read request are each a hit to the cache memory 112. In this case, the CPU 110 starts at T5 to issue the respective L1 write-back signals of the three read request signals via the HITM data line; and then, the three respective sets of cache data are outputted from the cache memory 112 of the CPU 110 via the HD data line successively at T10, T15, and T20. When the CPU interface 151 receives the first read request, it issues at T3 the corresponding internal read-request signal via the DADS data line to the memory control unit 152. Subsequently, when the CPU interface 151 receives the second read request, the CPU interface 151 promptly issues at T6 the corresponding internal read-request signal via the DADS data line to the memory control unit 152 without waiting until the CPU 110 issues the L1 write-back signal of the second read request. Next, in response to the third read request from the CPU 110, the CPU interface 151 promptly issues at T9 the corresponding internal read-request signal via the DADS data line to the memory control unit 152 without waiting until the CPU 110 issues the L1 write-back signal of the third read request. During this read operation, each of the read requests is a hit to the cache memory 112. Therefore, for each read request, the CPU interface 151 issues a read-stop signal via the MDOFF data line to the memory control unit 152 at T10, T23, and T36, respectively, after the memory control unit 152 completes outputting the last block of data for each read request.

The memory control unit 152, in response to the first internal read-request signal from the CPU interface 151, first checks that the requested data are located in an opened page. Then, at T5, the memory control unit 152 issues a read-enable signal to the memory unit 130 for the first read request. In response, the memory unit 130 starts at T7 to output the requested four blocks of data via the MD data line to memory control unit 152. When the memory unit 130 completes outputting the last block of data, a read-stop signal for the first read request is received by the memory control unit 152. This read-stop signal causes the CPU interface 151 to abandon the received data, and then starts at T12 to issue a write-enable signal to the memory unit 130, causing the cache data to be written back to the memory unit 130. When the memory unit 130 completes the writing of the third block of cache data, the memory control unit 152 starts to issue successively a precharge-enable signal, an activate-enable signal, and a read-enable signal to the memory unit 130 for the second read request. In response, the memory unit 130 starts at T20 to output the requested data. When the memory unit 130 completes outputting the last block of data, however, a read-stop signal for the second read request is received by the memory control unit 152. This read-stop signal causes the CPU interface 151 to abandon the received last block of data and then start at T25 to issue a write-enable signal to the memory unit 130, causing the cache data to be written back to the memory unit 130. At T27 when the memory unit 130 completes the writing of the third block of cache data, the memory control unit 152 starts to issue successively a precharge-enable signal, an activate-enable signal, and a read-enable signal to the memory unit 130 for the third read request. In response, the memory unit 130 starts at T33 to output the requested data. When the memory unit 130 completes outputting the last block of data, however, a read-stop signal for the third read request is received by the memory control unit 152. This read-stop signal causes the CPU interface 151 to abandon the received last block of data and then start at T38 to issue a write-enable signal to the memory unit 130, causing the cache data to be written back to the memory unit 130.

Conclusion

In conclusion, the method and system of the invention is characterized by the prompt transfer of each read request from the CPU to the memory control unit, right after it is issued and without waiting until the CPU issues the L1 write-back signal of the current read request. Therefore, the invention can help reduce the period of waiting states required by the CPU, thus increasing the overall memory access performance by the CPU. The overall system performance of the computer system is also increased.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A memory accessing and controlling method suitable for controlling the transfer of data between a CPU and a memory unit, the method comprising:

receiving a read request from the CPU;

issuing an internal read request after the read request being received by a latency, but before a checking time point that is for determining whether or not a level 1 (L1) cache write-back signal is issued later;

issuing a read-stop signal, if the CPU L1 write-back signal is received at the checking time point, and the last data block of the read request is received, causing the read request data to be abandoned; and writing back data issued by the CPU into the memory unit.

2. The method of claim 1, wherein the CPU is capable of outputting desired write-back-data at a preset time period later after the level 1 (L1) cache write-back signal is issued.

3. A memory access control system for controlling a memory access operation by a central processing unit (CPU) to a memory unit, wherein the CPU can access desired data on the memory unit through the memory access control system, the system comprising:

a CPU interface coupled to the CPU for receiving a CPU read request and issuing a corresponding internal access request after the CPU read request being received by a latency, but before a checking time point that is for determining whether or not a level 1 (L1) cache write-back signal is issued later, wherein if the CPU later issues the level 1 (L1) cache write-back signal corresponding to the read request signal at the checking time point, then the CPU interface issues a read-stop signal when the last data block of the read request is received; and a memory control unit, coupled between the CPU interface and the memory unit, in which the memory control unit can access the desired data according to the internal access request, wherein as the memory control unit receives the read-stop signal, the memory control unit disregards received internal access requested data and immediately starts to write the write-back-data, issued by the CPU, into the memory unit.

4. The system of claim 3, wherein the memory unit comprises a synchronous dynamic random access memory (SDRAM).

5. The system of claim 3, wherein the CPU issues the level 1 (L1) cache write-back signal at a preset time period later after the read request is issued.

6. The system of claim 3, wherein the CPU is capable of outputting the write-back-data at a preset time period later after the level 1 (L1) cache write-back signal is issued.

7. The system of claim 3, wherein the CPU interface issues the read-stop signal according to the level 1 (L1) cache write-back signal after the memory control unit transfers the write-back-data to the memory unit.

* * * * *